Jan. 10, 1961 P. S. FAY ET AL 2,967,358
SATELLITE DEMONSTRATION MODEL
Filed Dec. 24, 1958 2 Sheets-Sheet 1

INVENTORS
PHILIP S. FAY
GILBERT W. NICHOLS
BY *Leland P. Chapman*
ATTORNEY

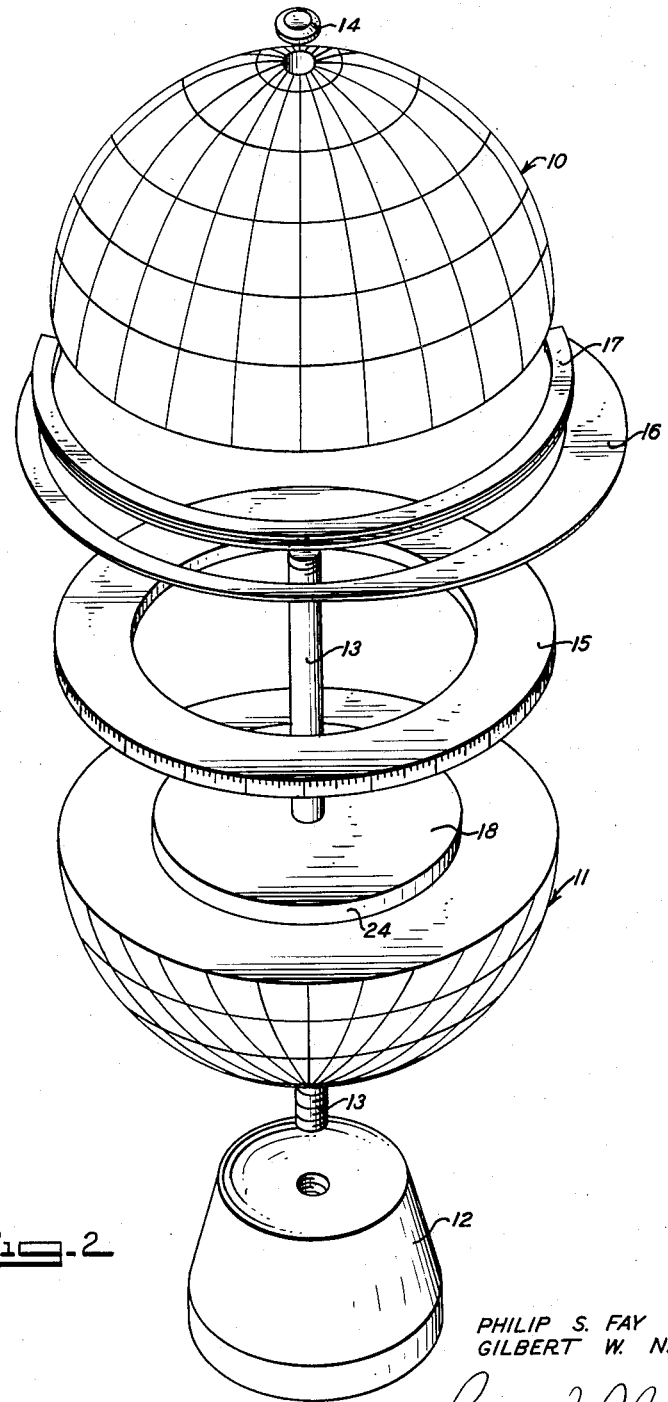

United States Patent Office 2,967,358
Patented Jan. 10, 1961

---

2,967,358

SATELLITE DEMONSTRATION MODEL

Philip S. Fay, Lyndhurst, and Gilbert W. Nichols, Eastlake, Ohio, assignors to The Standard Oil Company, Cleveland, Ohio, a corporation of Ohio Filed Dec. 24, 1958, Ser. No. 782,865

3 Claims. (Cl. 35—46)

This invention relates to a model or demonstration device for illustrating the orbital movement of a satellite about a celestial body, such as the movement of an artificial earth satellite about the earth.

It is among the objects of this invention to provide a satellite demonstration device which represents in correct scale and relative position the orbit of a satellite about the earth or other celestial body and which is adjustable to enable accurate representation of the orbit of a satellite at any desired time.

Other objects of the invention are to provide an instructional device which will aid in the visualization and understanding of orbital parameters and also enable the visualization and calculation of the position of a satellite when viewed from any position on the celestial body. In addition, provision is made for the representation and use of any shaped satellite orbit, either actual or imaginary, with the model.

The device generally comprises a globe, means supporting said globe at one pole thereof, an equatorial band carried by said globe rotatable in the equatorial plane with respect to said globe, an elliptically-shaped plane surface depicting a satellite orbit having a circular opening therein adapted to surround a diameter of said globe, and means for pivotally supporting said surface on said equatorial band along a diameter thereof. The globe is preferably formed of two hemispheres which are rotatable with respect to each other. The upper hemisphere may represent a terrestrial hemisphere, i.e. northern or southern hemisphere, and the lower hemisphere may represent the celestial sphere. The terrestrial hemisphere is inscribed with meridian and latitude lines and the celestial sphere is graduated in declination and right ascension. The rotatable equatorial band is calibrated from 0 to 360 degrees and the elliptical orbit is pivotally supported thereon at 0 and 180 degrees. The elliptical orbit is also rotatable in its plane to enable illustration of orbital precession. The model additionally has locking means for locking the two hemispheres against rotation with respect to each other and also locking means for locking the elliptical orbit against pivotal movement with respect to the hemispheres forming the globe.

The device may accordingly be set to the inclination, right ascension of the ascending node, argument of perigee and meridian position of any satellite for any given time. The precessional motions of the satellite orbit may be simply demonstrated on the model. Additionally, the height, viewing angle, angle to the meridian and angle to the horizontal of the satellite from any point on the surface of the celestial body will be evident from inspection.

In the drawings, Figure 1 illustrates the satellite demonstration model of the invention set up to depict a satellite orbit.

Figure 2 is an exploded view showing the component parts of the satellite demonstration model of the invention.

Figure 1:
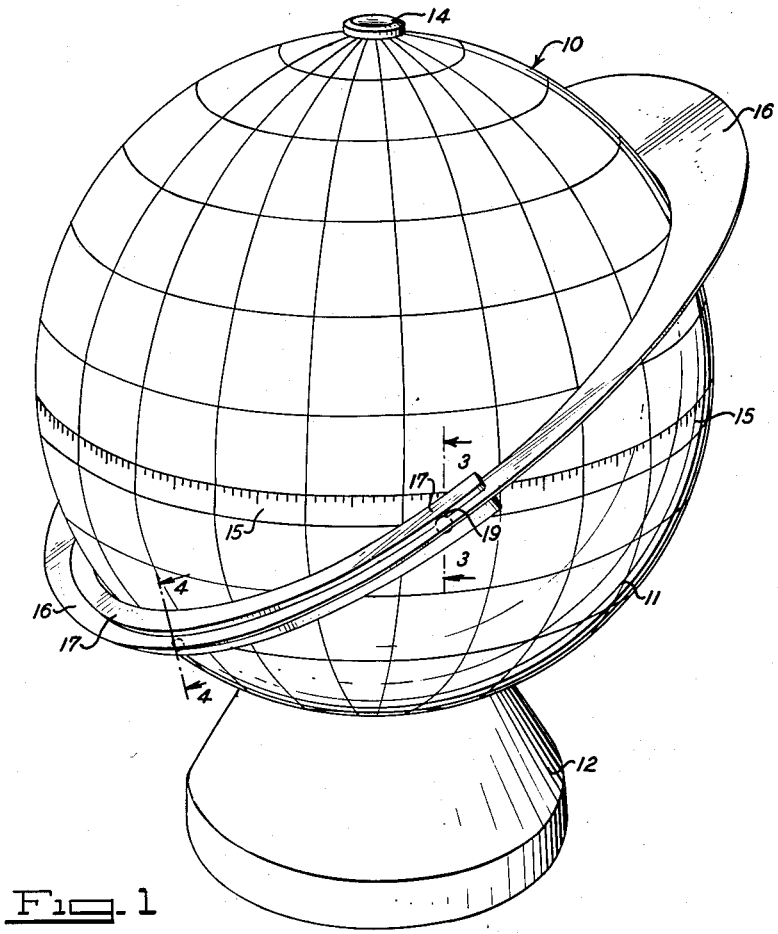

As will be apparent from the drawings, the model includes a stand 12 which supports a lower hemisphere 11 and an upper hemisphere 10 by means of threaded rod 13 extending through the hemispheres. The upper hemisphere 10 is rotatable with respect to the lower hemisphere 11 and a locking nut 14 is provided for threaded engagement with rod 13 to lock upper hemisphere 10 against rotation. A ring or band 15 representing the equator is positioned between the two hemispheres and is rotatable with respect to them. The equatorial band 15 is calibrated from 0 to 360 degrees.

Figure 3:
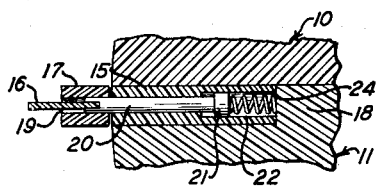
Figure 3 is a cross-section taken along lines 3—3 of Figure 1 when the orbit is pivoted to lie in the plane of the equator.

A semicircular ring section 17 is pivotally supported by band 15 at 0 and 180 degrees, respectively. The ring section 17 is of channel-shaped cross-section and carries an elliptically shaped orbit disc 16 in channel 19 thereof. As shown in Figure 3, the band 15 has radial openings therethrough in the plane of the equator at the 0 and 180 degree positions which contain pins 20 for pivotally supporting the ring section 17. The pins 20 are urged outwardly by means of springs positioned between the pin heads 21 and the abutting perimeter 24 of the upstanding annular portion 18 on the lower hemisphere 11. The orbit disc 16 is frictionally carried in the channel of the ring section 17 and is rotatable in its plane with respect to the ring section 17.

Figure 4:
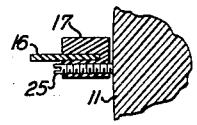
Figure 4 is a cross-section taken along lines 4—4 of Figure 1.

As shown in Figure 4, the ring section 17 carries a locking screw 25 in threaded engagement therewith. The locking screw may thus be tightened against the lower hemisphere 11 to lock the orbit disc against pivotal movement.

The hemispheres 10 and 11 may be made of any suitable material such as rigid, light-weight plastic material and may be either solid or hollow. The upper terrestrial hemisphere 10 may represent either the northern or southern hemisphere and preferably is inscribed with outlines of the earth's features as well as the meridian and latitude lines. The lower celestial hemisphere 11 is graduated in declination and right ascension.

The orbit disc is made of thin rigid material, such as transparent plastic and is cut to the shape of the satellite orbit with a circular opening therein to fit over the sphere. Because the orbit shape of an artificial satellite changes with time, new orbit discs 16 must be made and positioned on the device to accurately represent the actual orbit. Normally, however, the orbit changes imperceptibly on a day-to-day basis and accordingly the same orbit disc may be used for several weeks. The disc 16 is simply removable from the model by disassembling the model, removing the springs and pins 20 and removing the disc 16 from the ring section 17.

The method of setting up the model for an artificial satellite is as follows:

The elliptical orbit disc 16 is cut to the required size and eccentricity. Using the most recent orbit data available, the argument of perigee and right ascension of the node are calculated for the desired time. The published data state these values at a specific time, the "epoch," and their rate of change. The elapsed time since epoch multiplied by the rate of change gives the corrections to be added to the positions at epoch. The orbit disc 16 is mounted in the ring section 17 and slipped around until its perigee point follows the ascending node (0 degree on the equatorial band 15) by the calculated number of degrees for the desired time. The equatorial band 15 is rotated until the 0 degree mark follows by the calculated number of degrees the meridian on the lower celestial sphere 11 which contains the vernal equinox, i.e. until the ascending node is positioned at the calculated right ascension. If information is available concerning the latitudes and times of equator crossings of the satellite, this latter step is unnecessary and the orbit may be oriented directly relative to the upper terrestrial hemisphere 10. The orbit disc 16 is tilted to the correct inclination by using the latitude lines on upper hemisphere 10 and locked in place by set screw 25. The upper hemisphere 10 is then rotated until either the observer's meridian or Greenwich meridian is correctly oriented in right ascension and relative to the lower hemisphere 11. A table of right ascension of Greenwich meridian at midnight on successive days is prepared and 15 degrees per hour are added for the period since midnight preceding the desired time to enable making the latter setting.

The model is now completely set up to correctly represent the satellite course and position at the desired time. The following example illustrates setting up the model for an actual artificial satellite, Vanguard I, for the Cleveland, Ohio, meridian pass on March 26, 1958 at 11:32′57″ p.m. Eastern Standard Time. In this case, the upper hemisphere 10 is the northern hemisphere for realistic illustration. The following data is available from the Vanguard Computing Center:

| | |
|---|---|
| Epoch | 12:27 Universal Time 3/17/58. |
| Nodal period | 134.29 minutes. |
| Apogee height | 2463.6 statute miles. |
| Perigee height | 405.1 statute miles. |
| Inclination | 34.3 degrees. |
| Right ascension of ascending node | 154.59 degrees—3.04 degrees/day. |
| Argument of perigee | 128.08 degrees, 4.43 degrees/day. |
| Eccentricity | 0.1906. |
| Semi-major axis | 1.3619 earth radii. |

*Step 1.*—The orbit disc is prepared by scribing a circle (of a diameter slightly larger than that of the model sphere) on a 1/16″ sheet of stiff plastic, marking apogee and perigee distances from the center of the earth (on the same scale as that of the model sphere) along the extensions of a diameter, and scribing a second circle through the apogee and perigee points with a center half-way between. The orbit disc is then cut out with a jig saw.

*Step 2.*—To determine the node position at the desired time, 11:33 p.m. EST 3/26/58 is first converted to the equivalent 4:33 universal time 3/27/58. The epoch 12:27 universal time 3/17/58 is then subtracted to find the elapsed time, which gives 9 days, 16 hours. The change in node position is —3.04 degrees per day. The product of $9^{16}/_{24}$ times —3.04° equals —29.4°, the correction to be applied to the node position at epoch. 154.59°—29.4° equals 125.2°, the desired node position. To determine the argument of perigee, the elapsed time, $9^{16}/_{24}$ days, is multiplied by the change in argument of 4.43° per day. This gives 42.8°, which must be added to the argument of perigee at epoch (128.08°) to give the argument of perigee at the desired time (170.9°).

*Step 3.*—The orbit disc is mounted in the ring section and slipped around until the perigee point is 171° after the node point.

*Step 4.*—The equatorial band is back around to put the node point at 125° right ascension on the lower (celestial) hemisphere.

*Step 5.*—The orbit disc is inclined to 34.3°, by setting the north point of the arc at that latitude, and locked in place.

*Step 6.*—The position of Greenwich meridian at midnight EST 3/26/58 is at 260° right ascension (obtained from a table prepared as above). At 11:32′57″ p.m. it has moved eastward by 15°/hr. times $23^{33}/_{60}$ hours= 353.5°. 260° plus 353.5°=613.5° or (—360°) 253.5° right ascension. Thus the upper (terrestrial) hemisphere is rotated, until Greenwich meridian is at 253.5° right ascension, and locked in place.

The model is now completely set up to represent the position of the orbit of Vanguard I at the desired time. The orbit crosses South Florida at an angle of about 65° to the Cleveland meridian. The altitude of the satellite at this meridian crossing is about 2250 miles, and its line of sight distance from Cleveland is about 2780 miles. It is at an angle of about 27° above the southern horizon and it is roughly one-third of the way from apogee to perigee. The north point is over the North Atlantic at about 37° West longitude. All of this information is evident on simple inspection or measurement on the model.

While the invention has been described with reference to specific embodiments, they are to be considered illustrative rather than limiting, and it is intended to cover all other embodiments and modifications which fall within the spirit and scope of the appended claims.

We claim:

1. A satellite demonstration device comprising a globe having upper and lower hemispheres rotatably positioned with respect to each other, means supporting the lower hemisphere at the pole, an equatorial band carried by said globe rotatable in the equatorial plane with respect to both hemispheres, an elliptically shaped plane surface depicting a satellite orbit having a circular opening therein adapted to surround a diameter of said globe, means for pivotally supporting said surface on said equatorial band along a diameter thereof, and means for rotatably supporting said surface in the plane thereof with respect to the pivotal support means.

2. The satellite demonstration device set forth in claim 1 wherein said equatorial band is calibrated from 0 to 360 degrees and the pivotal support means comprises two pivots positioned at 0 and 180 degrees.

3. A satellite demonstration device comprising a globe having an upper terristrial hemisphere and a lower celestial hemisphere rotatably positioned with respect to each other, means supporting the lower hemisphere at the pole, an equatorial band carried by said globe rotatable in the equatorial plane with respect to both hemispheres, said band being calibrated from 0 to 360 degrees, an elliptically shaped plane surface depicting a satellite orbit having a circular opening therein adapted to surround a diameter of said globe, a semicircular ring portion in said circular opening for rotatably supporting said surface in the plane thereof and pivot pins carried by said equatorial band at 0 and 180 degrees pivotally supporting said ring portion.

References Cited in the file of this patent

UNITED STATES PATENTS

| | | |
|---|---|---|
| 445,393 | Cowell | Jan. 27, 1891 |
| 477,846 | Rassweiler | June 28, 1892 |
| 1,206,867 | Lewis | Dec. 5, 1916 |
| 1,849,202 | Pfluger | Mar. 15, 1932 |

UNITED STATES PATENT OFFICE
CERTIFICATE OF CORRECTION

Patent No. 2,967,358 January 10, 1961

Philip S. Fay et al.

It is hereby certified that error appears in the above numbered patent requiring correction and that the said Letters Patent should read as corrected below.

Column 3, line 60, for "back" read -- backed --; column 4, line 44, for "terristrial" read -- terrestrial --.

Signed and sealed this 12th day of September 1961.

(SEAL)
Attest:

ERNEST W. SWIDER
Attesting Officer

DAVID L. LADD
Commissioner of Patents
USCOMM-DC